(12) United States Patent
Aoki et al.

(10) Patent No.: US 12,024,934 B2
(45) Date of Patent: Jul. 2, 2024

(54) OPENING AND CLOSING MEMBER CONTROL DEVICE AND OPENING AND CLOSING MEMBER CONTROL METHOD

(71) Applicant: DENSO CORPORATION, Kariya (JP)

(72) Inventors: Yoshio Aoki, Kariya (JP); Yutaka Naito, Kariya (JP); Hiromichi Ono, Kariya (JP)

(73) Assignee: DENSO CORPORATION, Kariya (JP)

( * ) Notice: Subject to any disclaimer, the term of this patent is extended or adjusted under 35 U.S.C. 154(b) by 947 days.

(21) Appl. No.: 16/976,129

(22) PCT Filed: Mar. 27, 2019

(86) PCT No.: PCT/JP2019/013107
§ 371 (c)(1),
(2) Date: Aug. 27, 2020

(87) PCT Pub. No.: WO2019/202931
PCT Pub. Date: Oct. 24, 2019

(65) Prior Publication Data
US 2020/0408021 A1 Dec. 31, 2020

(30) Foreign Application Priority Data
Apr. 16, 2018 (JP) ................. 2018-078316

(51) Int. Cl.
*E05F 15/41* (2015.01)
*B60J 1/17* (2006.01)
(Continued)

(52) U.S. Cl.
CPC ............. *E05F 15/41* (2015.01); *B60J 1/17* (2013.01); *E05F 11/382* (2013.01);
(Continued)

(58) Field of Classification Search
CPC ....... E05F 15/41; E05F 11/382; E05F 15/695; E05F 15/75; E05F 15/77; B60J 1/17; E05Y 2900/55; E05Y 2400/36; E05Y 2400/40
(Continued)

(56) References Cited

U.S. PATENT DOCUMENTS 10,760,319 B2 *  9/2020  Shibata ................. E05F 15/695
10,815,714 B2 * 10/2020  Aoshima ............... E05F 15/695
(Continued)

FOREIGN PATENT DOCUMENTS

CN           101532361 A      9/2009
JP           2003-253939 A    9/2003
(Continued)

*Primary Examiner* — Tyler D Paige
(74) *Attorney, Agent, or Firm* — Oliff PLC

(57) ABSTRACT

An opening-closing member controller that solves the problem includes a motor, a speed detection unit, an entrapment determination unit, and a control unit. The motor opens and closes an opening-closing member of a vehicle. The speed detection unit outputs a speed signal corresponding to a rotation speed of the motor. The entrapment determination unit determines whether entrapment of foreign material by the opening-closing member has occurred based on the speed signal. The control unit reverses or stops the motor when the entrapment determination unit determines that entrapment has occurred. The entrapment determination unit performs the determination at shorter time intervals when a remote operation switch that is separated from the vehicle is operated to close the opening-closing member than when a vehicle operation switch that is arranged in the vehicle is operated to close the opening-closing member.

7 Claims, 3 Drawing Sheets

(51) Int. Cl.
    *E05F 11/38*     (2006.01)
    *E05F 15/695*     (2015.01)
    *E05F 15/75*     (2015.01)
    *E05F 15/77*     (2015.01)

(52) U.S. Cl.
    CPC ............ E05F 15/695 (2015.01); E05F 15/75 (2015.01); E05F 15/77 (2015.01); *E05Y 2900/55* (2013.01)

(58) Field of Classification Search
    USPC .......................................................... 701/49
    See application file for complete search history.

(56) References Cited

U.S. PATENT DOCUMENTS

| | | | |
|---|---|---|---|
| 2005/0005706 A1* | 1/2005 | Reichinger | G01L 1/243 73/800 |
| 2008/0191713 A1* | 8/2008 | Hauer | H03M 3/496 324/658 |
| 2011/0071735 A1 | 3/2011 | Witek | |
| 2014/0259928 A1* | 9/2014 | Morris | E05F 15/71 49/31 |

FOREIGN PATENT DOCUMENTS

| | | |
|---|---|---|
| JP | 2007-016441 A | 1/2007 |
| JP | 2015-209715 A | 11/2015 |
| JP | 2017-172147 A | 9/2017 |

* cited by examiner

OPENING AND CLOSING MEMBER CONTROL DEVICE AND OPENING AND CLOSING MEMBER CONTROL METHOD

CROSS-REFERENCE TO RELATED APPLICATIONS

The present application is based on Japanese Patent Application No. 2018-078316 filed on Apr. 16, 2018, the entire contents of which are incorporated herein by reference.

TECHNICAL FIELD

The present disclosure relates to an opening-closing member controller for a vehicle and an opening-closing member control method.

BACKGROUND ART

With a conventional power window controller or the like as known in the art, a portable device or the like that is separated from the vehicle is operated to open and close a window glass (refer to Patent Document 1).

PRIOR ART DOCUMENTS

Patent Document

Patent Document 1: Japanese Laid-Open Patent Publication No. 2003-253939

SUMMARY OF THE INVENTION

Problems that the Invention is to Solve

An opening-closing member controller such as a power window controller may include an entrapment prevention function that reverses or stops a motor when determining that entrapment of foreign material has occurred. However, when closing the window glass by operating the portable device or the like, the user may not be nearby. Thus, when closing the window glass by operating the portable device or the like, it is desirable that entrapment be determined with higher accuracy than when closing the window glass by operating a vehicle operation switch that is arranged in the vehicle.

It is an objective of the present disclosure to provide an opening-closing member controller that determines entrapment with high accuracy when a remote operation switch is operated.

Means for Solving the Problems

An opening-closing member controller that solves the problem includes a motor, a speed detection unit, an entrapment determination unit, and a control unit. The motor opens and closes an opening-closing member of a vehicle. The speed detection unit outputs a speed signal corresponding to a rotation speed of the motor. The entrapment determination unit determines whether entrapment of foreign material by the opening-closing member has occurred based on the speed signal. The control unit reverses or stops the motor when the entrapment determination unit determines that entrapment has occurred. The entrapment determination unit performs the determination at shorter time intervals when a remote operation switch that is separated from the vehicle is operated to close the opening-closing member than when a vehicle operation switch that is arranged in the vehicle is operated to close the opening-closing member.

With this configuration, the entrapment determination unit performs the determination at shorter time intervals when the remote operation switch that is separated from the vehicle is operated to close the opening-closing member than when the vehicle operation switch that is arranged in the vehicle is operated to close the opening-closing member. This determines entrapment with high accuracy. Specifically, the range of the entrapment load, when determining that entrapment has occurred, is narrowed.

BRIEF DESCRIPTION OF THE DRAWINGS

The objective, other objectives, features, and advantages of the present disclosure will become clear in the detailed description below with reference to the accompanying drawings.

MODES FOR CARRYING OUT THE INVENTION

A power window controller, which serves as an opening-closing member controller, according to one embodiment will now be described with reference to FIGS. 1 to 3.

Figure 1:
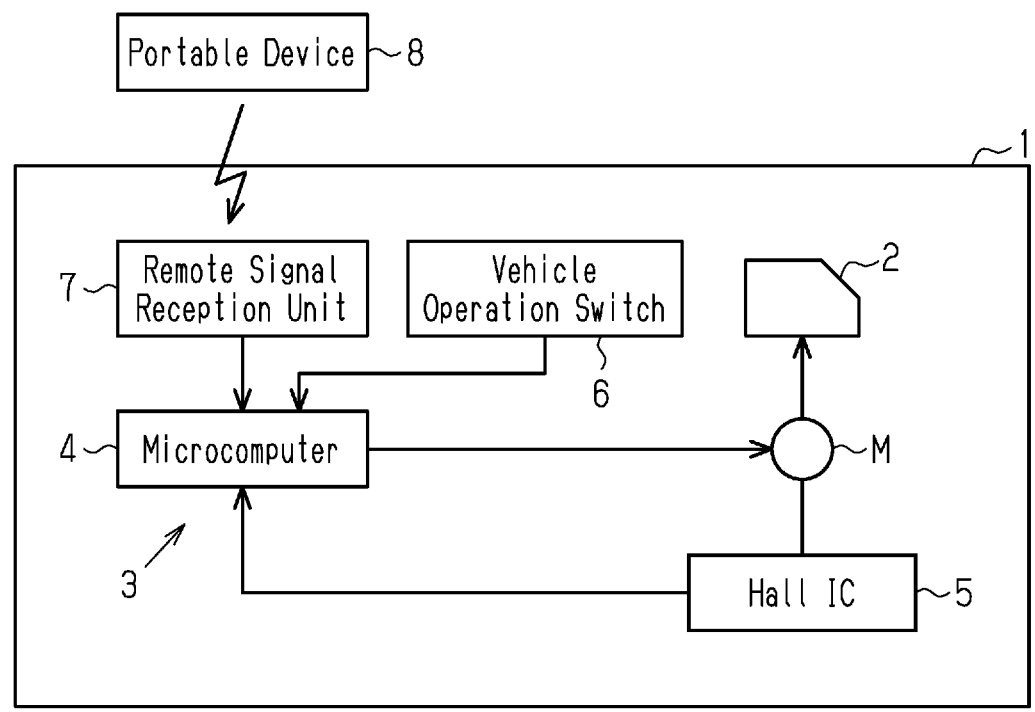
FIG. 1 is a schematic block diagram showing a vehicle according to one embodiment.
Figure 2:
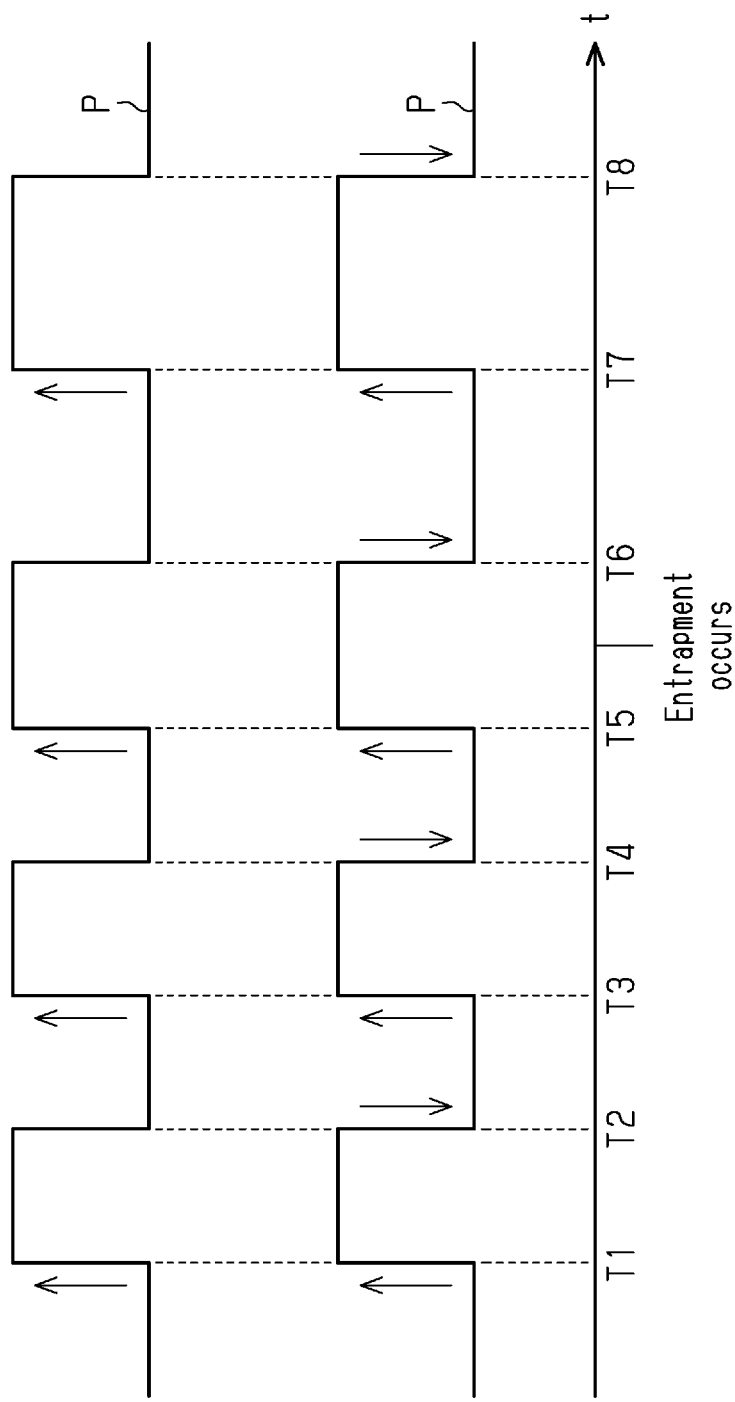
FIG. 2A is a waveform chart according to one embodiment.
FIG. 2B is a waveform chart according to one embodiment.

As shown in FIG. 1, a door of a vehicle 1 includes a window glass 2 that serves as an opening-closing member and is movable vertically. The window glass 2 is connected to a motor M in a power window controller 3 by a regulator or the like (not shown).

The power window controller 3 includes the motor M, a microcomputer 4, which serves as a control unit and an entrapment determination unit, and a Hall IC 5, which serves as a speed detection unit. The microcomputer 4 is connected to the Hall IC 5 and is also connected to the motor M by a drive circuit (not shown). The Hall IC 5 outputs, as a speed signal corresponding to the rotation speed of the motor M, a pulse signal to the microcomputer 4 in accordance with a change in the magnetic flux of a sensor magnet that is rotated integrally with the shaft of the motor M.

The microcomputer 4 is also connected to a vehicle operation switch 6 and a remote signal reception unit 7 that are arranged in the vehicle 1. When a portable device 8, such as a mobile phone or a remote control key, serving as a remote operation switch separated from the vehicle 1 is operated, the remote reception unit 7 is configured to receive a signal corresponding to the operation.

When the microcomputer 4 receives a signal based on the operation of the vehicle operation switch 6 or the portable device 8, the microcomputer 4 drives the motor M in accordance with the signal to open or close (vertically move) the window glass 2.

The microcomputer 4 (i.e., entrapment determination unit) determines whether entrapment of foreign material by the window glass 2 has occurred based on a pulse signal (speed signal) sent from the Hall IC 5 when the window glass 2 is closing.

The microcomputer 4 (control unit), when determining that entrapment has occurred, reverses the motor M and opens the window glass 2.

The microcomputer 4 (entrapment determination unit) of the present embodiment is set to determine whether entrapment of foreign material has occurred at shorter time intervals when the portable device 8 is operated to close the window glass 2 than when the vehicle operation switch 6 is operated to close the window glass 2.

Specifically, the microcomputer 4 (entrapment determination unit) of the present embodiment performs the determination whenever the pulse signal rises if the vehicle operation switch 6 is operated to close the window glass 2, and the microcomputer 4 performs the determination whenever the pulse signal rises and whenever the pulse signal falls if the portable device 8 is operated to close the window glass 2.

In other words, as shown in FIG. 2A, the microcomputer 4 (entrapment determination unit) determines whether entrapment has occurred whenever the pulse signal rises at times T1, T3, T5, T7 if the vehicle operation switch 6 is operated to close the window glass 2. Further, as shown in FIG. 2B, the microcomputer 4 (entrapment determination unit) determines whether entrapment has occurred whenever the pulse signal P rises and whenever the pulse signal P falls at times T1 to T8 if the portable device 8 is operated to close the window glass 2. FIGS. 2A and 2B show the pulse signal P if entrapment of foreign material has occurred between times T5 and T6. In this case, the rotation speed of the motor M is reduced after time T6. When the vehicle operation switch 6 is operated to close the window glass 2, the microcomputer 4 determines that entrapment has occurred at time T7. When the portable device 8 is operated to close the window glass 2, the microcomputer 4 determines that entrapment has occurred at time T6.

The microcomputer 4 (entrapment determination unit) of the present embodiment also performs the determination so that the maximum entrapment load when the portable device 8 is operated to close the window glass 2 is less than the maximum entrapment load when the vehicle operation switch 6 is operated to close the window glass 2.

The microcomputer 4 (entrapment determination unit) of the present embodiment also performs the determination so that the minimum entrapment load when the portable device 8 is operated to close the window glass 2 is greater than the minimum entrapment load when the vehicle operation switch 6 is operated to close the window glass 2 (so as not to reverse motor M in response to small entrapment load).

Figure 3:
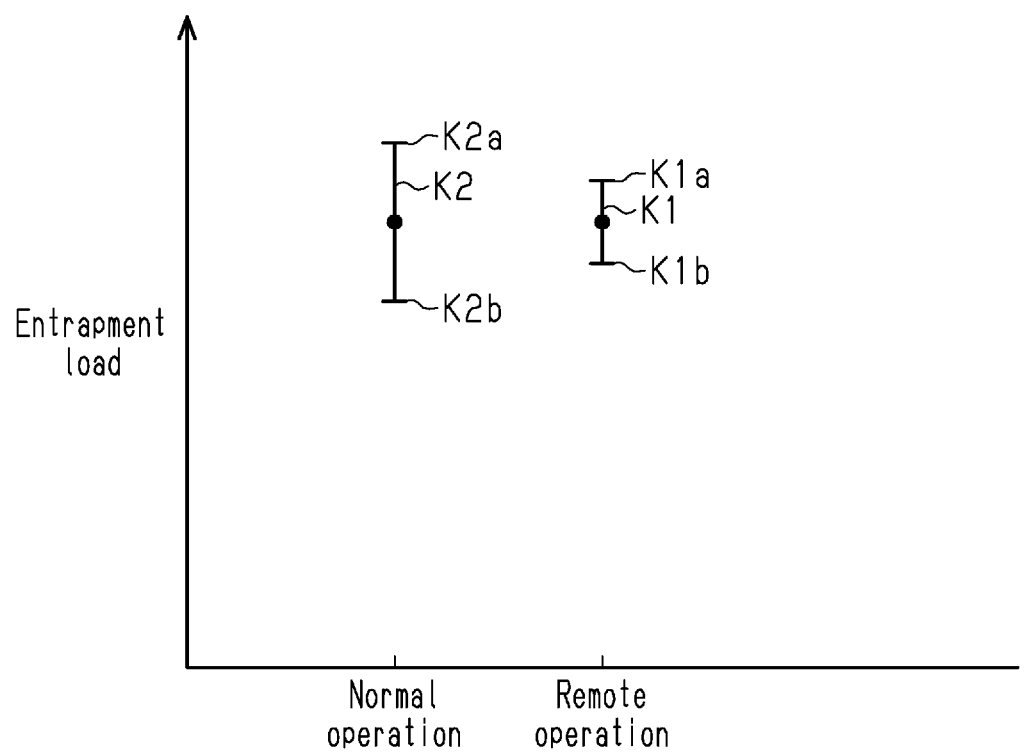
FIG. 3 is a characteristic diagram showing an entrapment load according to one embodiment.

Specifically, as shown in FIG. 3, the microcomputer 4 determines whether entrapment of foreign material has occurred at shorter time intervals when the portable device 8 is operated to close the window glass 2 (remote operation) than when the vehicle operation switch 6 is operated to close the window glass 2 (normal operation). This narrows the range of the entrapment load when the microcomputer 4 determines that entrapment has occurred. In other words, the range of entrapment load K1 used to determine that entrapment has occurred when the portable device 8 is operated to close the window glass 2 (remote operation) is less than the range of entrapment load K2 used to determine that entrapment has occurred when the vehicle operation switch 6 is operated to close the window glass 2 (normal operation). In the present embodiment, as shown in FIG. 3, maximum entrapment load K1$a$ when the portable device 8 is operated to close the window glass 2 (remote operation) is set to be less than maximum entrapment load K2$a$ when the vehicle operation switch 6 is operated to close the window glass 2 (normal operation). Further, minimum entrapment load K1$b$ when the portable device 8 is operated to close the window glass 2 (remote operation) is set to be greater than minimum entrapment load K2$b$ when the vehicle operation switch 6 is operated to close the window glass 2 (normal operation).

The operation of the power window controller 3 will now be described.

When, for example, the vehicle operation switch 6 is operated, the motor M is driven to open or close the window glass 2. During the closing action, the determination of whether entrapment has occurred is performed whenever the pulse signal P from the Hall IC 5 rises, for example, at times T1, T3, T5, T7 as shown in FIG. 2A. As shown in FIG. 2A, if entrapment of foreign material occurs between times T5 and T6, the microcomputer 4 determines that the entrapment has occurred at time T7 and then reverses the motor M to open the window glass 2.

When, for example, the portable device 8 is operated, the motor M is driven to open or close the window glass 2. During the closing action, the determination of whether entrapment has occurred is performed the pulse signal P from the Hall IC 5 rises and falls, for example, at times T1 to T8 as shown in FIG. 2B. As shown in FIG. 2B, if entrapment of foreign material occurs between times T5 and T6, the microcomputer 4 determines that the entrapment has occurred at time T6 and then reverses the motor M to open the window glass 2.

The embodiment has the following advantages.

(1) The microcomputer 4 (entrapment determination unit) determines whether entrapment of foreign material has occurred at shorter time intervals when the portable device 8 is operated to close the window glass 2 than when the vehicle operation switch 6 is operated to close the window glass 2. This determines entrapment with high accuracy. Specifically, the range of the entrapment load, when determining that entrapment has occurred, is narrowed (refer to FIG. 3). When determinations are constantly performed at short time intervals, the determination accuracy will be higher than necessary and, for example, a large load will always be applied to the microcomputer 4 (entrapment determination unit).

(2) The microcomputer 4 (entrapment determination unit) performs the determination whenever the pulse signal rises if the vehicle operation switch 6 is operated to close the window glass 2, and the microcomputer 4 performs the determination whenever the pulse signal rises and falls if the portable device 8 is operated to close the window glass 2. This simplifies the process. In other words, if a signal other than the pulse signal is used to change the time intervals for determination, the process would be complicated. However, the time intervals for determination are changed based solely on the pulse signal to simplify the process.

(3) The microcomputer 4 (entrapment determination unit) performs the determination so that the maximum entrapment load when the portable device 8 is operated to close the window glass 2 is less than the maximum entrapment load when the vehicle operation switch 6 is operated to close the window glass 2. This decreases the maximum entrapment load when the portable device 8 is operated.

(4) The microcomputer 4 (entrapment determination unit) performs the determination so that the minimum entrapment load when the portable device 8 is operated to close the window glass 2 is greater than the minimum entrapment load when the vehicle operation switch 6 is operated to close the window glass 2. This increases the minimum entrapment load when the portable device 8 is operated. Thus, erroneous control is reduced such as reversing of the motor M when detecting a small entrapment load even though foreign material is actually not entrapped.

(5) The Hall IC 5 that outputs a pulse signal as a speed signal serves as the speed detection unit. This determines entrapment with higher accuracy in comparison with when an ammeter that outputs a current value of the current supplied to the motor M serves as the speed detection unit. Specifically, when the rotation speed is calculated from the current value, a ripple current needs to be converted into a pulse signal using the Fourier transform or the like, which is likely to cause an error. In comparison, the Hall IC 5 directly outputs a pulse signal corresponding to the rotation speed and obtains the rotation speed with high accuracy to determine entrapment with higher accuracy.

The embodiment may be modified as follows. The present embodiment and the following modification can be combined as long as the combined modifications are not in contradiction.

In the embodiment, the microcomputer 4 (entrapment determination unit) performs the determination whenever the pulse signal rises if the vehicle operation switch 6 is operated, and the microcomputer 4 performs the determination whenever the pulse signal rises and falls if the portable device 8 is operated. Instead, the time intervals for determination may be changed through a different process. For example, a signal other than the pulse signal may be used to change the time interval for determination. Further, for example, if the cycle of the pulse signal corresponding to the speed signal is short and determination in each cycle is difficult, determination need only be performed at fewer cycles when the portable device 8 is operated than when the vehicle operation switch 6 is operated.

In the embodiment, the microcomputer 4 (entrapment determination unit) performs the determination so that the maximum entrapment load when the portable device 8 is operated to close the window glass 2 is less than the maximum entrapment load when the vehicle operation switch 6 is operated to close the window glass 2. Instead, the determination may be performed so that the maximum entrapment loads are the same. In this case, the minimum entrapment load when the portable device 8 is operated to close the window glass 2 can be further increased. Accordingly, erroneous control such as reversing of the motor M when detecting a small entrapment load is reduced in a more preferred manner in a case where foreign material is actually not entrapped.

In the embodiment, the microcomputer 4 (entrapment determination unit) performs the determination so that the minimum entrapment load when the portable device 8 is operated to close the window glass 2 is greater than the minimum entrapment load when the vehicle operation switch 6 is operated to close the window glass 2. Instead, the determination may be performed so that the minimum entrapment loads are the same. In this case, the maximum entrapment load when the portable device 8 is operated to close the window glass 2 can be further decreased.

In the embodiment, the Hall IC 5 serves as the speed detection unit that outputs a speed signal corresponding to the rotation speed of the motor M. Instead, another speed detection unit such as an ammeter that outputs a current value of current supplied to the motor M as a speed signal may be used. The ammeter may use the Fourier transform or the like to convert a ripple current into a pulse signal, and the same determination may be performed using the pulse.

In the embodiment, the microcomputer 4 (control unit) reverses the motor M when determining that entrapment has occurred. Instead, the microcomputer 4 may stop the motor M when determining that entrapment has occurred.

Even when a condition other than the portable device 8 being operated is satisfied, the microcomputer 4 (entrapment determination unit) of the embodiment may determine whether entrapment of foreign material has occurred at shorter time intervals than normal (when the condition other than the portable device 8 being operated is not satisfied) in which the vehicle operation switch 6 is operated to close the window glass 2. For example, if there is a need to determine whether entrapment of foreign material has occurred at short time intervals when the vehicle operation switch 6 is operated to close the window glass 2, determination may be performed at shorter time intervals (e.g., whenever pulse signal rises and falls) than when the vehicle operation switch 6 is operated to close the window glass 2 (normal operation).

The embodiment is directed to the power window controller 3 in which the window glass 2 serves as an opening-closing member but may be directed to, for example, a different opening-closing member controller that opens and closes a different opening-closing member such as a roof panel.

The microcomputer 4 is not limited to a device that includes a central processing unit and a memory and executes all the above-described processes through software. For example, microcomputer 4 may include dedicated hardware (application-specific integrated circuit: ASIC) that executes at least part of the various processes. That is, the microcomputer 4 may be circuitry including 1) one or more dedicated hardware circuits such as an ASIC, 2) one or more processors (microcomputers) that operate according to a computer program (software), or 3) a combination thereof.

While the present disclosure is described with reference to examples, the present disclosure is not limited to the example or the configuration of the example. The present disclosure includes various variations and modifications within an equivalent range. In addition, various combinations and forms and other combinations and forms, which include only one element or more, shall be within the scope or a range of ideas of the present disclosure.

The invention claimed is:

1. A controller, comprising:
a motor that opens and closes an opening-closing means of a vehicle;
a detector that detects a rotation speed of the motor and outputs a speed signal corresponding to the rotation speed of the motor; and
a microcomputer configured to:
determine whether entrapment of foreign material by the opening-closing means has occurred based on the speed signal; and
reverse or stop the motor when the entrapment is determined to have occurred, wherein
the microcomputer is configured to perform the determination at shorter time intervals when a remote operation switch, which is separated from the vehicle, is operated to close the opening-closing means than when a vehicle-mounted switch, which is arranged in the vehicle, is operated to close the opening-closing means.

2. The controller according to claim 1, wherein
if the vehicle-mounted switch is operated to close the opening-closing means, the microcomputer performs the determination whenever a pulse signal that corresponds to the speed signal rises or whenever the pulse signal falls, and if the remote operation switch is operated to close the opening-closing means, the microcomputer performs the determination whenever the pulse signal that corresponds to the speed signal rises and whenever the pulse signal falls.

3. The controller according to claim 1, wherein the microcomputer performs the determination so that a maximum entrapment load when the remote operation switch is operated to close the opening-closing means is less than a maximum entrapment load when the vehicle-mounted switch is operated to close the opening-closing means.

4. The controller according to claim 1, wherein the microcomputer performs the determination so that a minimum entrapment load when the remote operation switch is operated to close the opening-closing means is greater than a minimum entrapment load when the vehicle-mounted switch is operated to close the opening-closing means.

5. The controller according to claim 1, wherein the detector is a Hall IC that outputs a pulse signal as the speed signal.

6. A control method, comprising:
opening and closing an opening-closing means of a vehicle with a motor;
outputting, from a detector that detects a rotation speed of the motor, a speed signal corresponding to the rotation speed of the motor;
determining, with a microcomputer, whether entrapment of foreign material by the opening-closing means has occurred based on the speed signal; and
reversing or stopping, with the microcomputer, the motor when the entrapment is determined to have occurred, wherein
the determining is performed at a shorter time interval when a remote operation switch, which is separated from the vehicle, is operated to close the opening-closing means than when a vehicle-mounted switch, which is arranged in the vehicle, is operated to close the opening-closing means.

7. The method according to claim 6, wherein the detector is a Hall IC that outputs a pulse signal as the speed signal.

* * * * *